(12) United States Patent
Astecker et al.

(10) Patent No.: US 11,444,342 B2
(45) Date of Patent: Sep. 13, 2022

(54) STORAGE BATTERY COMPRISING A COOLING DEVICE CONNECTED TO THE BUS BAR

(71) Applicant: Miba eMobility GmbH, Laakirchen (AT)

(72) Inventors: Stefan Astecker, Schoerfling (AT); Stefan Gaigg, Gmunden (AT)

(73) Assignee: Miba eMobility GmbH, Laakirchen (AT)

(*) Notice: Subject to any disclaimer, the term of this patent is extended or adjusted under 35 U.S.C. 154(b) by 144 days.

(21) Appl. No.: 16/625,019

(22) PCT Filed: Jul. 2, 2018

(86) PCT No.: PCT/AT2018/060132
§ 371 (c)(1),
(2) Date: Jan. 24, 2020

(87) PCT Pub. No.: WO2019/006484
PCT Pub. Date: Jan. 10, 2019

(65) Prior Publication Data
US 2020/0161724 A1    May 21, 2020

(30) Foreign Application Priority Data
Jul. 3, 2017    (AT) .............................. A 50544/2017

(51) Int. Cl.
*H01M 10/613* (2014.01)
*H01M 10/6567* (2014.01)
*H01M 10/6556* (2014.01)
*H01M 50/20* (2021.01)

(52) U.S. Cl.
CPC ...... *H01M 10/613* (2015.04); *H01M 10/6556* (2015.04); *H01M 10/6567* (2015.04); *H01M 50/20* (2021.01)

(58) Field of Classification Search
CPC combination set(s) only.
See application file for complete search history.

(56) References Cited

U.S. PATENT DOCUMENTS

| 4,955,435 | A  | 9/1990  | Shuster et al. |
| 7,291,420 | B2 | 11/2007 | Bitsche et al. |
| 8,828,576 | B2 | 9/2014  | Kumar et al. |
| 8,852,772 | B2 | 10/2014 | Mcdonald |

(Continued)

FOREIGN PATENT DOCUMENTS

| CN | 1745438 A  | * 3/2006 | .......... H01M 10/613 |
| CN | 102089926 A |   6/2011 | |

(Continued)

OTHER PUBLICATIONS

International Search Report in PCT/AT2018/060132, dated Nov. 7, 2018.

*Primary Examiner* — Kaity V Chandler
(74) *Attorney, Agent, or Firm* — Collard & Roe, P.C.

(57) ABSTRACT

The invention relates to a rechargeable battery (1) comprising several storage modules (3) for electric current, wherein the storage modules (3) are interconnected via at least one busbar (4), and a cooling device (2), which comprises a single-layer or multi-layer film (5) and with this film (5) lies against the at least one busbar (4), is arranged on the busbar (4).

13 Claims, 4 Drawing Sheets

(56) References Cited

U.S. PATENT DOCUMENTS

| | | |
|---|---|---|
| 8,889,282 B2 | 11/2014 | Goesmann et al. |
| 8,962,172 B2 | 2/2015 | Bolze et al. |
| 9,546,827 B2 | 1/2017 | Ludwig et al. |
| 9,559,387 B2 | 1/2017 | Obrist et al. |
| 10,367,241 B2 | 7/2019 | Enning et al. |
| 2002/0177035 A1 | 11/2002 | Oweis et al. |
| 2004/0004461 A1 | 1/2004 | Hamada et al. |
| 2005/0089750 A1 | 4/2005 | Ng et al. |
| 2007/0037050 A1 | 2/2007 | Rigobert et al. |
| 2007/0114665 A1* | 5/2007 | Bayerer ............ H01L 25/072 257/E25.016 |
| 2008/0179315 A1 | 7/2008 | Suzuki et al. |
| 2008/0311468 A1 | 12/2008 | Hermann et al. |
| 2009/0059528 A1 | 3/2009 | Damsohn et al. |
| 2011/0304297 A1 | 12/2011 | Sohn |
| 2012/0107635 A1 | 5/2012 | Hirsch et al. |
| 2012/0231313 A1* | 9/2012 | Kumar .............. H01M 10/613 429/120 |
| 2013/0071720 A1 | 3/2013 | Zahn |
| 2013/0122331 A1 | 5/2013 | Mcdonald |
| 2015/0295287 A1* | 10/2015 | Schnaars ........... H01M 10/625 165/80.4 |
| 2016/0233561 A1 | 8/2016 | Lee |
| 2016/0233564 A1 | 8/2016 | Rinker et al. |
| 2017/0055366 A1* | 2/2017 | Backhaus ............ H01G 2/08 |
| 2017/0104252 A1 | 4/2017 | Wuensche et al. |
| 2017/0200926 A1 | 7/2017 | Motokawa et al. |
| 2017/0338532 A1 | 11/2017 | Mott et al. |
| 2018/0069278 A1* | 3/2018 | Mastrandrea ..... H01M 10/6553 |
| 2018/0069281 A1* | 3/2018 | Tutzer ............... H01M 10/653 |
| 2018/0151929 A1 | 5/2018 | Song et al. |
| 2018/0238632 A1 | 8/2018 | Jia et al. |

FOREIGN PATENT DOCUMENTS

| | | | | |
|---|---|---|---|---|
| CN | 102683766 A | 9/2012 | | |
| CN | 102906933 A | 1/2013 | | |
| CN | 105408149 A | 3/2016 | | |
| CN | 105789728 A | 7/2016 | | |
| CN | 206 353 596 U | 7/2017 | | |
| DE | 9012327 U1 | 11/1990 | | |
| DE | 100 34 134 A1 | 1/2002 | | |
| DE | 10 2008 053 311 A1 | 4/2009 | | |
| DE | 10 2008 034 867 A1 | 1/2010 | | |
| DE | 10 2008 059 970 A1 | 6/2010 | | |
| DE | 10 2010 032 460 A1 | 2/2012 | | |
| DE | 10 2011 075 820 A1 | 11/2012 | | |
| DE | 10 2011 118 686 A1 | 5/2013 | | |
| DE | 10 2013 220 044 A1 | 4/2015 | | |
| DE | 10 2013 221 747 A1 | 4/2015 | | |
| DE | 10 2013 021 553 A1 | 6/2015 | | |
| DE | 10 2015 204 678 A1 | 9/2016 | | |
| EP | 1 261 065 A2 | 11/2002 | | |
| EP | 2 451 004 A1 | 5/2012 | | |
| EP | 2 744 033 A1 | 6/2014 | | |
| FR | 2 782 399 A1 | 2/2000 | | |
| FR | 3013515 A1 | 5/2015 | | |
| JP | 2006-271063 A | 10/2006 | | |
| JP | 2012216360 A | * 11/2012 | ......... | H01M 10/653 |
| JP | 2014-078471 A | 5/2014 | | |
| WO | 2010/012341 A1 | 2/2010 | | |
| WO | 2010/056750 A2 | 5/2010 | | |
| WO | 2011/088997 A1 | 7/2011 | | |
| WO | 2012/062644 A1 | 5/2012 | | |
| WO | 2012/072348 A1 | 6/2012 | | |
| WO | WO-2013010912 A2 | * 1/2013 | ......... | H01M 10/653 |
| WO | 2016/101872 A1 | 6/2016 | | |
| WO | 2017/015826 A1 | 2/2017 | | |
| WO | 2017/108581 A1 | 6/2017 | | |

* cited by examiner

STORAGE BATTERY COMPRISING A COOLING DEVICE CONNECTED TO THE BUS BAR

CROSS REFERENCE TO RELATED APPLICATIONS

This application is the National Stage of PCT/AT2018/060132 filed on Jul. 2, 2018, which claims priority under 35 U.S.C. § 119 of Austrian Application No. A 50544/2017 filed on Jul. 3, 2017, the disclosure of which is incorporated by reference. The international application under PCT article 21(2) was not published in English.

BACKGROUND OF THE INVENTION

1. Field of the Invention

The invention relates to a rechargeable battery comprising several storage modules for electric current, wherein the storage modules are interconnected via at least one busbar, and a cooling device is arranged on the busbar.

2. Description of the Related Art

The service life and effectiveness as well as the safety of a rechargeable battery for e-mobility depend, among other factors, on the temperature during operation. For this reason, various concepts have been suggested for the cooling and/or temperature control of the rechargeable batteries. Inter alia, it has been suggested that the busbar, by means of which the individual cells of the battery are interconnected, be cooled. For example, DE 10 2011 118 686 A1 de-scribes a battery having a plurality of battery cells the busbar of which can be flowed through by a coolant.

SUMMARY OF THE INVENTION

The present invention is based on the object of creating a structurally simple cooling option for rechargeable batteries for e-mobility.

In the aforementioned rechargeable battery, the object of the invention is achieved in that the cooling device comprises a single-layer or multi-layer film and lies against the busbar with said film.

The advantage of this is that the flexible film lies against the busbar better, which allows for heat transmission into the cooling fluid to be improved without additional measures. This is particularly advantageous since the individual storage modules are not arranged to be exactly aligned with one another but there can be a slight offset between the storage modules. The busbar is thus not exactly planar but has irregularities as viewed across its extent in the longitudinal direction. By the use of the flexible film, additional measures for tolerance compensation can be dispensed with, whereby a significant facilitation of the production of the rechargeable battery can be achieved. Moreover, a reduction in weight can be achieved by the film, which can serve to improve the effectiveness of the e-mobility by higher ranges.

According to another embodiment variant, it can be provided for that the cooling device comprises a further single-layer or multi-layer film, wherein the film and the further film are connected to one another forming the at least one coolant channel between the film and the further film. The advantage of this is that the cooling device is simply constructed of and/or consists of two film materials connected to one another. An additional arrangement and/or an additional incorporation of the coolant channel can be dispensed with since it is automatically created by the partial connection of the two film materials. The production of the cooling device can be carried out mainly automatically, while as regards the geometry of the cooling device and the concrete design of the at least one coolant channel there are merely very little restrictions as well.

According to a further embodiment variant, the film can consist of a laminate comprising a first plastic film, an enforcement layer connected thereto, a metal film connected to the enforcement layer or a metalized further plastic film connected to the enforcement layer. By means of the enforcement layer, an improved stiffness and stability can be achieved at the operating temperature of the rechargeable battery. Moreover, it became apparent that these films have a lower creeping tendency. The film thus further has a reduced thermal expansion, which leads to less stresses in the cooling device in case of temperature changes. By means of the metal film and/or the metalized further plastic film, a better heat distribution across the surface of the cooling device is achieved, whereby its efficiency can be improved. By the better heat distribution due to the improved thermal conductivity of the film, moreover, hotspots can be better prevented during operation of the cooling device. Besides this, the cooling device can hence be provided with a barrier function.

The further film can also comprise at least one second plastic film, which is partially connected to the first plastic film of the laminate of the film in connection areas, such that between the connection areas at least one cavity is formed, which forms the at least one coolant channel. This can serve to further simplify the production of the cooling device.

For the aforementioned reasons regarding the laminate of the film, according to a further embodiment variant it can be provided for that the further film also consists of a laminate comprising the second plastic film and an enforcement layer connected thereto.

It can also be provided for that the enforcement layer comprises a fiber reinforcement. With the fiber reinforcement, the coefficient of thermal expansion of the enforcement element can be reduced and be approximated to the value of the films. Thus, the heat transfer element can have fewer residual stresses and a lower tendency to warp.

In this regard, according to an embodiment variant, the fiber reinforcement can be formed of a woven fabric, whereby a further improvement of the mechanical behavior of the cooling device can be achieved.

It is also possible that the first plastic film and/or the second plastic film and/or the metalized further plastic film consists/consist of a plastic material that is selected from a group consisting of PE, POM, PA, PPS, PET, cross-linked polyolefins, thermoplastic elastomers on ether basis/ester basis, styrene block copolymers, silicone elastomers. These plastic materials have proved to be particularly advantageous for use in producing the cooling device with a higher degree of automation due to the improved extrusion capability.

To increase the cooling performance, it can be provided for that in the direction towards the at least one storage module several films are arranged on top of one another and several cooling channels are formed between these films. In this regard, the use of the film and optionally of the further film proves to be advantageous, since hence despite the higher cooling performance, a lower weight of the cooling device can be achieved.

Between the several films arranged on top of one another, according to an embodiment variant, a fiber layer can be arranged, whereby a further weight reduction can be achieved, in particular if according to an embodiment variant it is provided for that the coolant channel or the coolant channels is or are at least partially formed in the fiber layer.

According to another embodiment variant, it can be provided for that the coolant outlet and/or the coolant inlet is formed by a distancing element between the film and the further film. Thus, a better separation of the films of the cooling device in the region of the at least one coolant channel at least in the region of the inlet and/or outlet can be achieved, while at the same time an improved leakproofness of the cooling device in these regions can be achieved more easily.

For easier fastening of the cooling device on the rechargeable battery, it can be provided for that the cooling device is arranged between the poles of the storage modules and the busbar. Hence, the cooling device can be fastened by simple clamping.

The advantage of this is that according to an embodiment variant, for this purpose the film and/or the further film consists or consist at least partially of an electrically insulating material. Besides the cooling function, the cooling device can also assume the function of the electrical insulation.

According to another embodiment variant, it can be provided for that the busbar is partially arranged within the cooling device. On the one hand, hence, cooling of the busbar can be improved, on the other hand, an electrical insulation for the busbar can thus be provided in an easy manner.

BRIEF DESCRIPTION OF THE DRAWINGS

For the purpose of better understanding of the invention, it will be elucidated in more detail by means of the figures below.

These respectively show in a simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclo-sures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
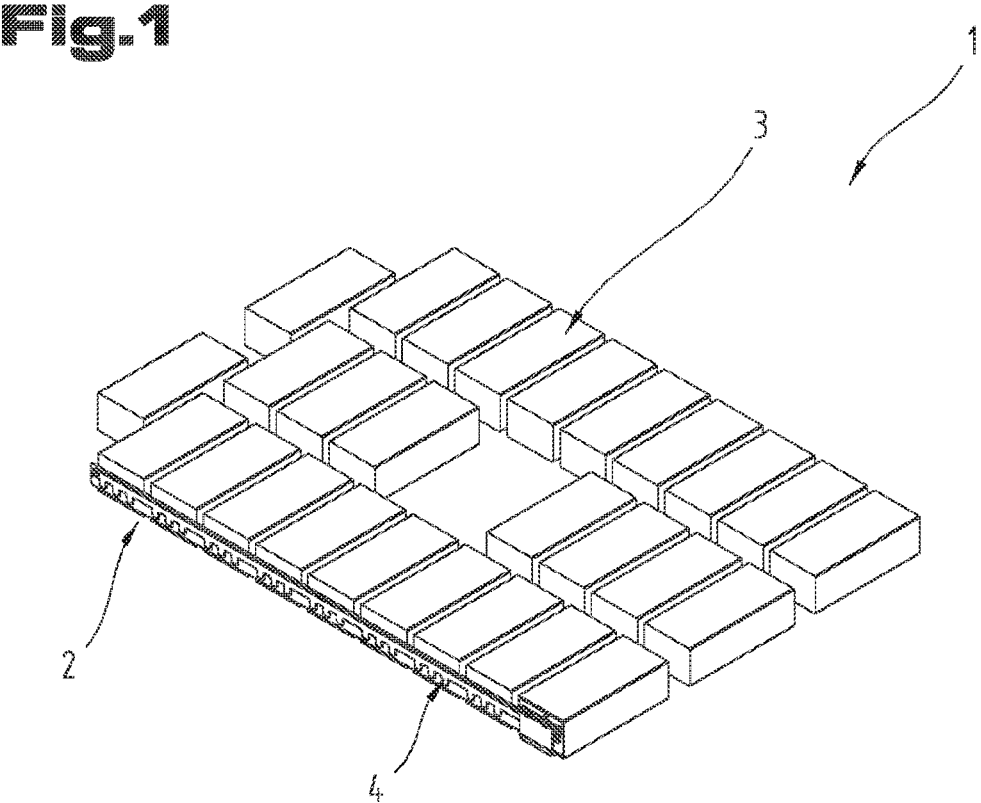
FIG. 1 a part of a rechargeable battery in an oblique view.
Figure 2:
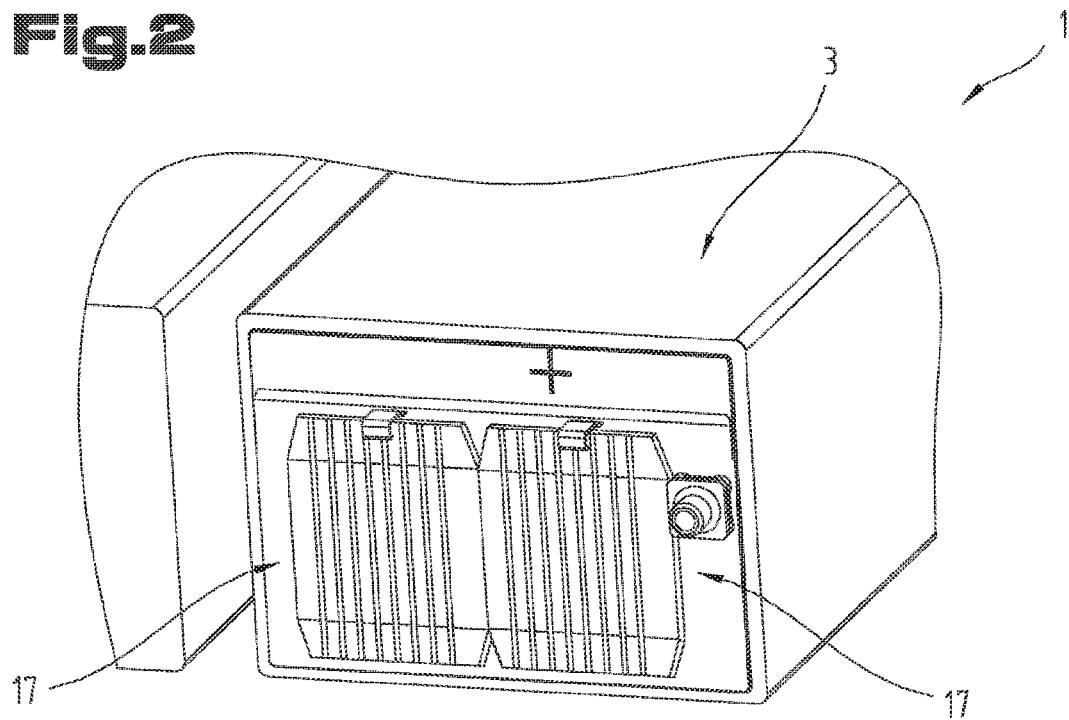
FIG. 2 a detail of the rechargeable battery in the region of the poles of the storage modules without cooling device.
Figure 3:
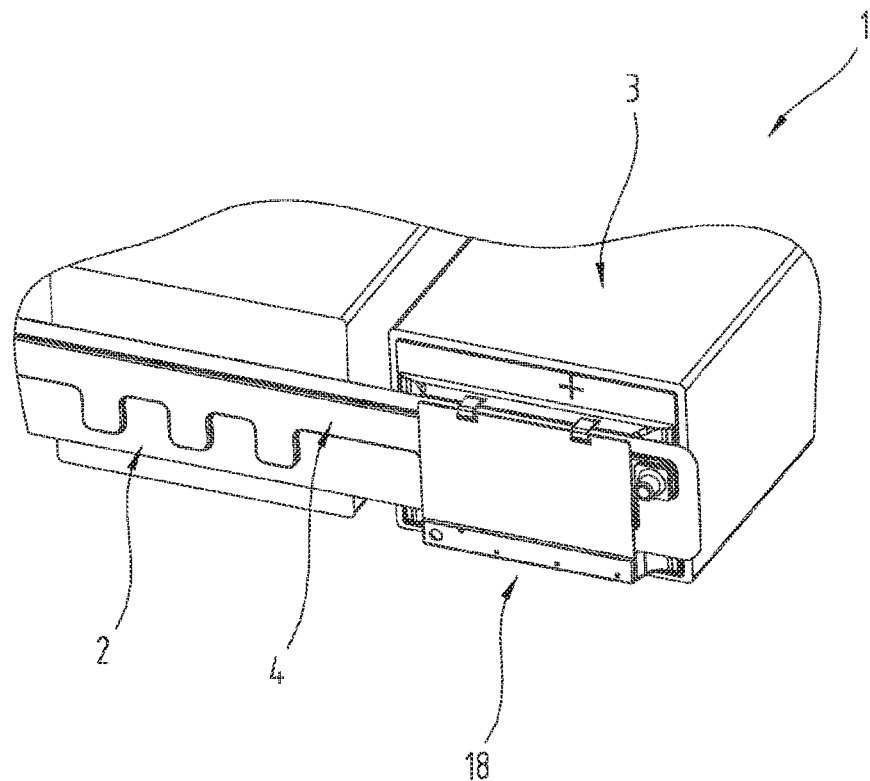
FIG. 3 the detail of the rechargeable battery in the region of the poles of the storage modules with a cooling device.

FIGS. 1 to 3 show cutouts of a rechargeable battery 1, i.e. an accumulator, in an oblique view, with FIGS. 1 and 3 showing the rechargeable battery 1 with a cooling device 2 and FIG. 2 showing the rechargeable battery 1 without this cooling device 2.

The rechargeable battery 1 comprises several storage modules 3 for electrical energy. In the represented example there are 27 storage modules 3. However, this number is not to be con-sidered restricting.

Several storage modules are electro-conductively interconnected via a busbar 4. Depending on the constructive arrangement of the storage modules 3 and their number, one or several 25 busbars 4 are arranged.

As the basic construction of such rechargeable batteries 1 for e-mobility is known from the prior art, reference is made thereto so as to avoid repetitions. The following description is thus restricted to the cooling device 2 of the rechargeable battery 1.

Reference is made to the fact that the temperature control is also covered by the term "cooling" within the meaning of the invention.

As can be seen from FIG. 1 and in particular from FIG. 3, the cooling device 2 is arranged to lie against the busbar 4. If there is more than one busbar 4, preferably, also more than one cooling device 2 is arranged, wherein in particular one cooling device 2 can be assigned to one busbar 4 in each case. Thus, one cooling device 2 can be arranged per busbar 4.

It is further preferred if the cooling device 2 extends across all storage modules 3 in one row, as can be seen from FIG. 1. However, in general, it is also possible to provide several cooling devices 2 per row of storage modules 3 in the rechargeable battery 1, for example two or three or four, such that for example the storage modules 3 are distributed to two or three or four, etc. cooling devices 2.

Figure 4:
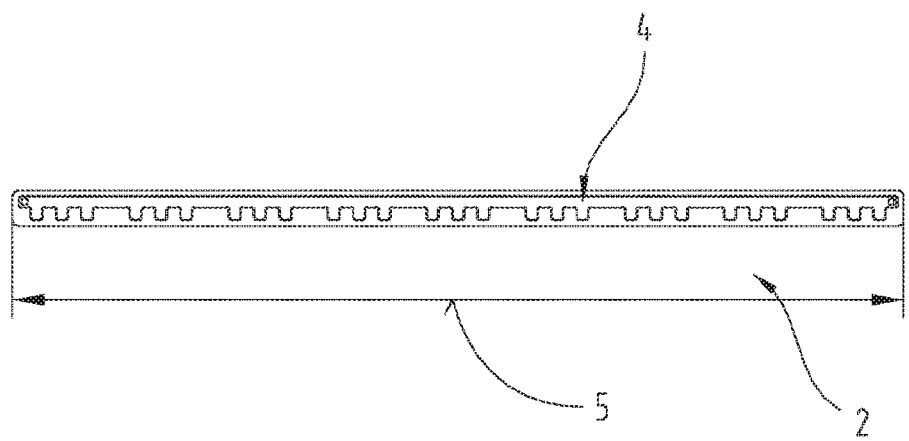
FIG. 4 a cooling device.

FIG. 4 shows a front view of an embodiment variant of the cooling device 2. The cooling device 2 preferably extends across the entire length of the busbar 4, which is adumbrated in FIG. 4.

Figure 5:
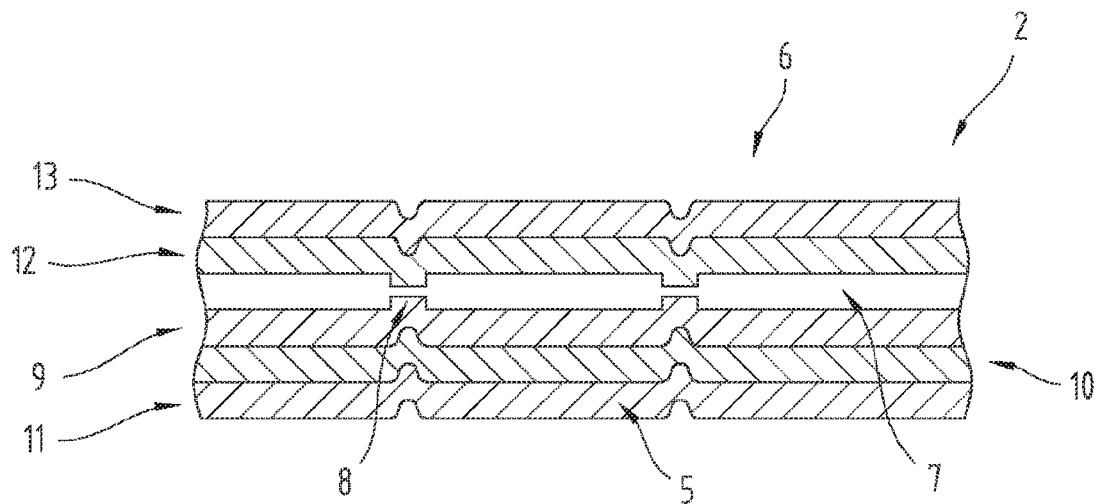
FIG. 5 a cutout from an embodiment variant of the cooling device.

In general, the cooling device 2 comprises a single-layer or multi-layer first film 5 in all embodiment variants (e.g. FIG. 5). By means of this first film 5, the cooling device 2, in particular directly, lies against the busbar 4. As the first film 5 is flexible, i.e. not stiff, said first film 5 can better adapt to surface irregularities of the busbar 4, which are for example present between the storage modules 3. Hence, heat transmission from the busbar 4 into the cooling device 2 can be improved.

At least one coolant channel is arranged and/or formed in the cooling device 2. The coolant channel preferably extends across at least 90%, in particular at least 99%, of a total length of the cooling device 2. It can also be provided for that more than one coolant channel is arranged and/or formed in the cooling device 2.

The coolant channel can have a straight, meandering, harp-shaped, branched, etc. extent. In this regard, the coolant channel in general extends at least from a coolant inlet to a coolant outlet of the cooling device 2. The specific extent of the coolant channel is among other factors determined by the amount of heat that needs to be conducted away, the geometry of the rechargeable battery 1, etc. In case of more than one coolant channel being formed and/or arranged in the cooling device 2, it is advantageous if a common inlet is arranged in front of the several coolant channels and a common outlet behind them, which can each be formed as collecting channels, from which the coolant channels branch out or into which they flow. However, it is also possible that each coolant channel has its own coolant inlet and/or its own coolant outlet.

Further, the coolant inlet and the coolant outlet can be arranged on one side of the cooling device 2. However, the coolant inlet and the coolant outlet can also be arranged and/or formed on and/or in different sides of the cooling device 2.

In particular, a liquid such as a water-glycol mixture is used as the coolant by which the cooling device 2 is flown through.

Further and optionally independent embodiment variants of the rechargeable battery 1 and/or the cooling device 2 of the rechargeable battery 1 are shown in FIGS. 5 to 7, wherein again, equal reference numbers and/or component designations are used for equal parts as in FIGS. 1 through 4 before. In order to avoid unnecessary repetitions, it is pointed to/reference is made to the detailed description regarding FIGS. 1 to 4.

FIG. 5 shows a cutout of an embodiment variant of the cooling device 2 in cross-section.

The cooling device 2 comprises the first film 5 and a single-layer or multi-layer second film 6.

At this point, it should be noted that a layer of a hard plastic material, to which the first film 5 is connected, can be used instead of the single-layer or multi-layer second film 6, although this is not the preferred embodiment variant.

The first film 5 and the second film 6 are connected to one another in connection areas 8 forming at least one coolant channel 7 between the first film 5 and the second film 6. The connection areas 8 extend along the longitudinal extent of the at least one coolant channel 7, wherein between the connection areas 8 non-connected areas remain in which the at least one coolant channel 7 is formed by the distancing of the first film 5 with respect to the second film 6. The first film 5 and the second film 6 extend across a surface which preferably at least approximately, in particular to 100%, corresponds to the surface of the cooling device 2 (as viewed in a plan view).

In this embodiment variant of the cooling device 2, the first film 5 consists of a laminate comprising a first plastic film 9, an enforcement layer 10 connected thereto, a metal film 11 connected to the enforcement layer 10 or a metalized further plastic film connected to the enforcement layer 10.

The at least one coolant channel 7 is not formed by separate components but by the just partial connection of the first film 5 to the second film 6. The wall and/or the walls of the at least one coolant channel 7 are thus formed by the first film 5 and the second film 6, preferably half by each.

Preferably, the second film 6 comprises at least one second plastic film 12 and/or consists thereof. The second plastic film 12 is partially connected to the first plastic film 9 of the laminate of the first film 5 in connection areas 8 such that between the connection areas 8 at least one cavity is formed which forms the at least one coolant channel 7.

It can further be provided for that according to an embodiment variant, for this purpose, the second film 6 also consists of a laminate comprising the second plastic film 12 and an enforcement layer 13 connected thereto.

In general, other laminates can be used as well. For example, merely the first film 5 can comprise the enforcement layer 10 or merely the second film 6 can comprise the enforcement layer 13. Likewise, structures of the first film 5 with more than three layers and/or structures of the second film 6 with more than two layers are possible.

The enforcement layer 13 of the second film 6 can differ from the enforcement layer 10 of the first film 5. However, preferably the two enforcement layers 10, 13 are formed equally.

The first film 5 and the second film 6 are arranged such that the two plastic films 9, 12 lie against one another and the mentioned partial connected is formed via these plastic films 9, 12. If the second film 6 comprises (merely) the second plastic film 12, said second plastic film 12 is arranged directly adjacent to the plastic film 9 of the first film 5 and connected thereto.

Instead of a metal film 11, a metalized further plastic film can also be used, while in this case the metalization is preferably arranged between the enforcement layer 10 and the further plastic film. Such a metalized further plastic film can also be used in the second film 6.

The first plastic film 9 and/or the second plastic film 12 and/or the metalized further plastic film preferably consists/consist to at least 80 wt. %, in particular at least 90 wt. %, of a thermoplastic material or of an elastomer. The thermoplastic material can be selected from a group comprising and/or consisting of polyethylene (PE), polyoxymethylene (POM), polyamide (PA), in particular PA 6, PA 66, PA 11, PA 12, PA 610, PA 612, polyphenylene sulphide (PPS), polyethylene terephthalate (PET), crosslinked polyolefins, preferably polypropylene (PP). The elastomer can be selected from a group comprising and/or consisting of thermoplastic elastomers such as thermoplastic vulcanizates, olefin-, amine-, ester-based thermoplastic polyurethanes, in particular ether-based/ester-based thermoplastic elastomers, styrene block copolymers, silicone elastomers.

At this point, it should be noted that the term plastic material is understood as a synthetic or natural polymer produced from corresponding monomers.

Preferably, the first plastic film 9 and/or the second plastic film 12 and/or the metalized further plastic film consists/consist of a so-called sealing film. This has the advantage that the respective films can be connected to one another directly.

However, it is also possible to use other plastic materials, such as thermosetting plastic materials and/or thermosetting materials, which are then for example adhered to one another by means of an adhesive. Two-part adhesive systems based on polyurethane or silicone or hot melt adhesive systems are particularly suitable for this purpose.

Preferably, the enforcement layer/enforcement layers 10, 13 comprise/comprises a or con-sist/consists of a fiber reinforcement.

The fiber reinforcement is preferably formed as a separate layer, which is arranged between the plastic film 9 and the metal film 11 and/or the metalized further plastic film or the plastic film 12 and the metalized further plastic film. If cavities are formed in the fiber reinforcement, these can also be at least partially filled with the plastic material of the plastic film 9 and/or the plastic film 12 or the metalized further plastic film.

The fiber reinforcement can be formed of fibers and/or threads, which are selected from a group comprising or consisting of glass fibers, aramid fibers, carbon fibers, mineral fibers such as basalt fibers, natural fibers such as hemp, sisal and combinations thereof.

Preferably, glass fibers are used as fiber reinforcement. The proportion of the fibers, in particular the glass fibers, in the fiber reinforcement can amount to at least 80 wt. %, in particular at least 90 wt. %. Preferably, the fibers and/or threads of the fiber reinforcement consist merely of glass fibers.

The fibers and/or threads can be present in the fiber reinforcement as roving, for example as a non-woven fabric. However, preferably the fibers and/or threads become a woven fabric or a knitted fabric. In this regard, it is also possible that the woven or knitted fabric is merely present in some regions and that the remaining regions of the fiber reinforcement are formed by a roving.

It is also possible that rubberized fibers and/or threads are used as or for the fiber reinforcement.

When using a woven fabric, different types of weaves are possible, in particular plain, twill or satin weave. Preferably, a plain weave is used.

However, it is also possible to use an open-mesh glass fabric or glass roving.

The fiber reinforcement can be formed as a single layer. However, it is also possible that the fiber reinforcement comprises several, optionally separate, individual layers, for example two or three, wherein at least individual or several individual layers can at least in some regions, preferably entirely, consist of fibers and/or threads different as compared to the rest of the individual layers.

In the alternative or in addition to the fiber reinforcement, the enforcement layer(s) 10, 13 can comprise a mineral filling. For example, calcium carbonate, talc, quartz, wollastonite, kaolin or mica can be used as a mineral filling (mineral filler material).

The metal film 11 in particular is an aluminum film. However, other materials such as copper or silver can also be used.

The metal film 11 can have a layer thickness of between 5 µm and 100 µm.

The metal film 11 and/or the metalization of the further plastic film can be arranged in regions in which the busbar 4 contacts the first film 5 only.

In case of the use of the metalized further plastic film, the mentioned metals can be used for the metalization. Preferably, the metalization has a layer thickness selected from a range of between 5 nm and 100 nm. The metal vapor deposition of the further plastic film can be carried out by means of a method known from the prior art.

The plastic film 9 and/or the plastic film 12 and/or the further plastic film, which comprise the metalization, can have a layer thickness of between 10 µm and 200 µm.

The layer thickness of the enforcement layer(s) 10, 13 can amount to between 5 µm and 50 µm.

The first film 5 can in particular comprise the following structure in the indicated order:
plastic film 9 of PP;
enforcement layer 10 of a glass fiber fabric;
metal film 11 of aluminum with a layer thickness of 12 µm.

In case of the second film 6 consisting merely of the plastic film 12, preferably a polyethylene terephthalate (PET) is used as the plastic material for it.

The first film 5 and/or the second film 6 can also comprise at least one further layer, such as at least one further enforcement layer and/or at least one primer layer and/or at least one thermotropic layer.

Although the first film 5 and the second film 6, if it also is a film laminate, can in general be used in the form of individual films for producing the cooling device 2, such that the film laminate(s) are only formed in the course of the production of the cooling device 2, it is advantageous if the first film 5 and/or the second film 6 are used as a (laminated) semi-finished product.

For connecting the individual layers of the laminate or the laminates, these can be adhered to one another by means of adhesives. The afore-mentioned adhesives are suitable for this purpose. Besides adhesives, coextrusion and extrusion coating can also be used as joining op-tions. Of course, a combination is also possible in which several plastic materials are coex-truded and adhesively laminated to one another with an extrusion-coated metal or (fiber) enforcement layer. In general, all known methods can be used for producing composite films and/or film laminates.

According to a further embodiment variant, it can be provided for that the cooling device 2 comprises at least one additional film, which is partially connected to the first film 5 or to the second film 6, as was described above with respect to the connection of the first film 5 to the second film 6. The coolant channels 7 can hence be arranged in at least two planes on top of one another, wherein in this case they are preferably not formed congruently but to be laterally offset with respect to one another in the manner described above and/or in the way to be described. In this case, it is advantageous if the first film 5 or the second film 6 comprise the plastic film 9 or the plastic film 12 on both outer sides (surfaces), such that via these the connection with the additional films can be established, i.e. in particular again two sealing films can be connected to one another.

Figure 6:
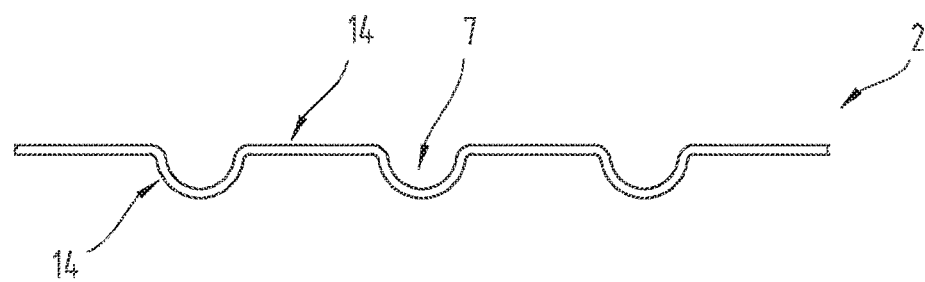
FIG. 6 a cutout from another embodiment variant of the cooling device.

FIG. 6 shows a cutout of another embodiment variant of the cooling device 2. Therein, a fiber layer 14, for example of a paper, is arranged between the plastic film 9 and the plastic film 12 (both represented in FIG. 5). This fiber layer 14 is designed to be liquid resistant. For this purpose, a coating 15 can be provided on the surfaces that come into contact with the coolant.

However, it is also possible that the fibers of the paper and/or of the fiber layer 14 are per se designed to be liquid proof, for example coated.

The coating 15 moreover has another function as well. In the fiber layer 14, the at least one coolant channel 7 is provided, for example by means of embossing or another shaping pro-cess. In order to be able to maintain the shape when the rechargeable battery 1 and/or the cooling device 2 is operated, the fiber layer 14 can be provided an increased solidity and/or stiffness by means of the coating 15.

The coating 15 can for example be a cured adhesive layer.

Figure 7:
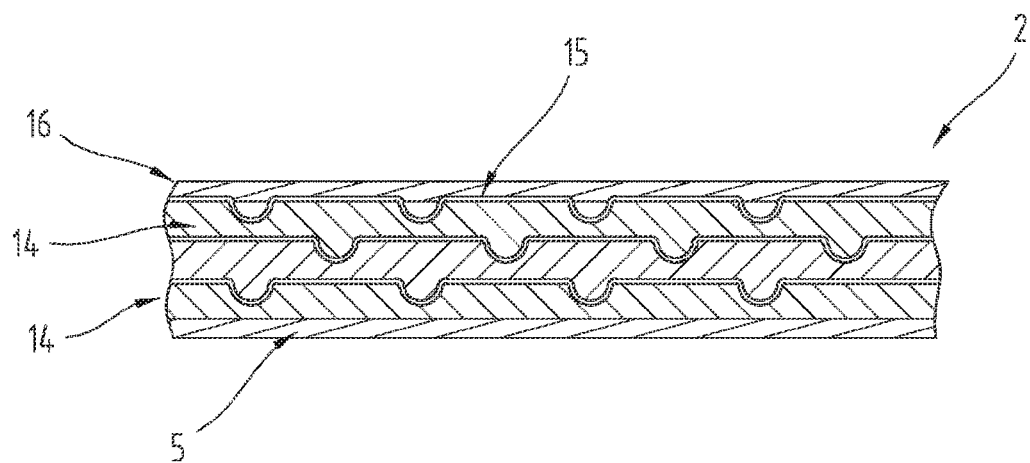
FIG. 7 a cutout from an embodiment variant of the cooling device with several cooling planes on top of one another.

So as to further reduce the weight of the rechargeable battery 1 and/or the cooling device 2, according to a further embodiment variant shown in FIG. 7, it can be provided for that several ones of these fiber layers 14 provided with the coating 15 are arranged between the first film 5 and the second film 6 so as to be located one above the other, in particular directly one above the other.

The first film 5 and/or the second film 6 can be designed as individual films or as laminates in these embodiment variants of the cooling device 2 as well.

In the preferred embodiment variant of the cooling device 2, it also comprises corresponding connecting elements for the connection of the inlet line and the outlet line for the coolant. In general, these can be designed as common connecting elements as are known from the prior art. However, in the preferred embodiment variant, these connecting elements are also at least partially, in particular entirely, made from a plastic material, wherein the aforementioned plastic materials can be used as plastic materials.

Figure 8:
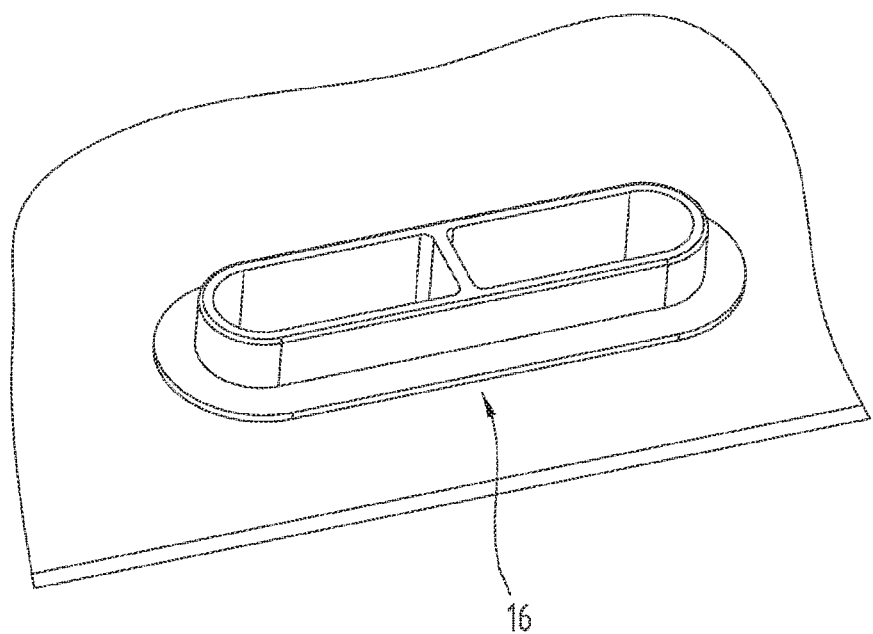
FIG. 8 a distancing element in an oblique view.

According to another embodiment variant of the rechargeable battery 1, it can be provided for that the coolant outlet and/or the coolant inlet is formed by a distancing element 16 between the first film 5 and the second film 6. An example for a distancing element 16 can be seen from FIG. 8. Preferably, the distancing elements 16 are also made from a plastic material. It is further preferred if via the distancing elements 16 the leakproofness of the connections of the cooling device 2 for the coolant is improved.

In this context, it should be noted that the specific placement of the connecting elements depends on the specific design of the at least one coolant channel 7.

The aforementioned collecting channels for the coolant can, just as the at least one coolant channel 7, be produced by means of the just partial connection of the first film 5 to the second film 6. In this regard, reference is made to the corresponding explanations above.

The described partial connection of the first film 5 to the second film 6 and/or an additional film and/or two plastic films 9, 12 of the laminates can be established in a laminating press. In this regard, the connection can be established by the effect of an increased temperature and an increased pressure, as is known from laminating and/or heat sealing. The specific temperature depends on the used plastic materials.

Instead of the laminating device, a press can also be used, especially for the production of long fiber reinforced first film 5 and second film 6 and/or a long fiber reinforced cooling device 2. At this, the fibers are impregnated and pressed with the plastic material, which results in the fiber reinforced film material.

For a higher degree of customizability of the cooling device 2 at a high degree of automation, it can be provided for that a welding robot is used for the connection. Hence, the connection areas 8 (FIG. 5) can be determined and programmed individually such that the arrangement and/or formation of the at least one coolant channel 7 can be adapted to individual require-ments very flexibly.

In the two mentioned methods for producing the cooling device 2, the connection of the first film 5 and second film 6 to one another is established in a materially bonded manner either by welding or adhering, while mixed variants of these methods are also possible. In general, other methods can be used for this purpose as well.

For example, temperature pulse welding, laser welding, IR welding, ultrasonic welding, high-frequency welding can be used as welding methods.

The cooling device 2 can for example be mounted to the rechargeable battery 1 by means of clamps. However, other fastenings, for example by means of pins or rivets, etc., are also possible.

Preferably, however, the cooling device 2 is arranged between the busbar 4 and poles 17 (FIG. 2) of the storage modules 3, in particular clamped between these two, as can be seen in FIG. 3. In this regard, a covering 18 can be provided, which covers the busbar 4 in this region.

However, it is also possible that the cooling device 2 is arranged, in particular clamped, between the covering 18 and the busbar 4.

In this regard, according to a further embodiment variant it can be provided for that the first film 5 and/or the second film 6 at least partly consists or consist of an electrically insulating material, for example an electrically insulating plastic material.

The cooling device 2 can be arranged to directly lie against the poles 17 and optionally to be connected thereto.

Preferably, the heat transfer from the busbar 4 to the cooling device 2 is as direct as possible, for example by clamping the cooling device 2 in the covering 18 or by means of additional clamping braces, etc.

According to another embodiment variant of the rechargeable battery 1, it can be provided for that the busbar 4 is partly arranged within the cooling device 2. In this regard, the busbar 4 can be partly arranged within the coolant channel 7. This does allow for improved cooling of the busbar 4; however, it also results in increased efforts with regard to the tightness of the cooling device 2. Thus, it can be provided for that the busbar 4 is separated from the coolant channel 7 by means of a further film.

The exemplary embodiments show possible embodiment variants, while it should be noted at this point that combinations of the individual embodiment variants are also possible.

Finally, as a matter of form, it should be noted that for ease of understanding of the structure of the rechargeable battery 1 and/or the cooling device 2, these are not obligatorily depicted to scale.

LIST OF REFERENCE NUMBERS

1 rechargeable battery
2 cooling device
3 storage module
4 busbar
5 first film
6 second film
7 coolant channel
8 connection area
9 first plastic film
10 enforcement layer
11 metal film
12 second plastic film
13 enforcement layer
14 fiber layer
15 coating
16 distancing element
17 pole
18 covering

The invention claimed is:

1. A rechargeable battery comprising several storage modules for electric current,
   wherein the storage modules are interconnected via at least one busbar, and a cooling device is arranged on the busbar,
   wherein the cooling device comprises a first film and with this first film lies directly against the at least one busbar,
   wherein the first film is single-layer or multi-layer, and
   wherein the first film comprises a laminate comprising a first plastic film and a first enforcement layer connected thereto, a metal film connected to the first enforcement layer or a metalized further plastic film connected to the first enforcement layer.

2. The rechargeable battery according to claim 1,
   wherein the cooling device comprises a second film,
   wherein the first film and the second film are connected to one another forming at least one coolant channel between the first film and the second film, and
   wherein the second film is single-layer or multi-layer.

3. The rechargeable battery according to claim 2, wherein the second film comprises at least one second plastic film, which is partially connected to the first plastic film of the laminate of the first film in connection areas, such that between the connection areas at least one cavity is formed, which forms the at least one coolant channel.

4. The rechargeable battery according to claim 3, wherein the second film also comprises a laminate comprising the second plastic film and a second enforcement layer connected thereto.

5. The rechargeable battery according to claim 1, wherein the first enforcement layer comprises a fiber reinforcement.

6. The rechargeable battery according to claim 5, wherein the fiber reinforcement is formed by a woven fabric.

7. The rechargeable battery according to claim 1, wherein at least one of the first plastic film, a second plastic film, and the metalized further plastic film comprises a plastic material that is selected from a group consisting of polyethylene (PE), polyoxymethylene (POM), polyamide (PA), polyphenylene sulfide (PPS), polyethylene terephthalate (PET), cross-linked polyolefins, thermoplastic elastomers on ether basis/ester basis, styrene block copolymers, silicone elastomers.

8. The rechargeable battery according to claim 1, wherein in the direction towards the at least one storage module several films are arranged on top of one another and several cooling channels are formed between these films.

9. The rechargeable battery according to claim 8, wherein a fiber layer is arranged between the several films arranged on top of one another.

10. The rechargeable battery according to claim 9, wherein the coolant channel or the coolant channels is or are at least partially formed in the fiber layer.

11. The rechargeable battery according to claim 1, wherein a coolant outlet and/or a coolant inlet is formed by a distancing element between the first film and the second film.

12. The rechargeable battery according to claim 1, wherein the cooling device is arranged between poles of the storage modules and the busbar.

13. The rechargeable battery according to claim 12, wherein at least one of the first film and the second film at least partly comprises an electrically insulating material.

* * * * *